US012139937B2

(12) United States Patent
Simmonds et al.

(10) Patent No.: US 12,139,937 B2
(45) Date of Patent: Nov. 12, 2024

(54) LATCHING ASSEMBLY

(71) Applicant: Camlock Systems Limited, Eastbourne (GB)

(72) Inventors: Zachary Simmonds, Eastbourne (GB); Stuart Parker, Eastbourne (GB)

( * ) Notice: Subject to any disclaimer, the term of this patent is extended or adjusted under 35 U.S.C. 154(b) by 265 days.

(21) Appl. No.: 17/588,797

(22) Filed: Jan. 31, 2022

(65) Prior Publication Data

US 2022/0154491 A1 May 19, 2022

Related U.S. Application Data

(63) Continuation-in-part of application No. PCT/GB2020/051160, filed on May 13, 2020.

(30) Foreign Application Priority Data

Jul. 31, 2019 (GB) ..................................... 1910909

(51) Int. Cl.
*E05B 47/00* (2006.01)
*E05C 3/16* (2006.01)

(52) U.S. Cl.
CPC ............ *E05B 47/0012* (2013.01); *E05C 3/16* (2013.01); *E05B 2047/0017* (2013.01); *E05B 2047/0069* (2013.01); *E05B 2047/0072* (2013.01)

(58) Field of Classification Search
CPC ......... E05B 47/0012; E05B 2047/0017; E05B 2047/0069; E05B 2047/0072; E05C 3/16
See application file for complete search history.

(56) References Cited

U.S. PATENT DOCUMENTS 5,915,766 A 6/1999 Baumeister et al.
7,021,684 B2 * 4/2006 Orbeta ................ E05B 47/0046 292/201
7,198,308 B2 * 4/2007 Lane ........................ E05B 79/12 292/DIG. 64
7,438,335 B1 * 10/2008 Uyeda ................. E05B 47/0046 292/341.15
8,047,585 B1 * 11/2011 Peabody ............. E05B 47/0046 292/341.15

(Continued)

FOREIGN PATENT DOCUMENTS

CN 2835480 11/2006
CN 1050350840 2/2016

(Continued)

OTHER PUBLICATIONS

International Searching Authority, International Search Report and Written Opinion for International Application No. PCT/GB2020/051160 dated Jul. 23, 2020, 13 pages.

(Continued)

*Primary Examiner* — Mark A Williams
(74) *Attorney, Agent, or Firm* — Egan, Enders & Huston LLP.

(57) ABSTRACT

A latching assembly for releasably securing a first member to a second member, the latch assembly comprising a housing, at least two jaws pivotally mounted to the housing, the jaws pivotable between an open position and a closed position, the assembly comprising a locking member moveable between a locked position to lock the jaws in the closed position and an unlocked position to allow the jaws to revert to the open position.

16 Claims, 8 Drawing Sheets

(56) References Cited

U.S. PATENT DOCUMENTS

| | | | | |
|---|---|---|---|---|
| 8,096,594 | B2 * | 1/2012 | Uyeda | E05B 47/0046 292/341.15 |
| 8,454,063 | B2 * | 6/2013 | David | E05B 47/0046 292/341.15 |
| 8,894,105 | B2 * | 11/2014 | Kutschat | E05B 79/04 292/216 |
| 9,702,167 | B2 * | 7/2017 | Liao | E05B 47/0046 |
| 2003/0155776 | A1 | 8/2003 | Dipl-Ing | |
| 2004/0113440 | A1 * | 6/2004 | Zweibohmer | E05B 85/10 292/336.3 |
| 2004/0178643 | A1 | 9/2004 | Marzolf et al. | |
| 2007/0200357 | A1 * | 8/2007 | Westerwick | E05B 77/42 292/201 |
| 2008/0305938 | A1 | 12/2008 | Hayasaka | |
| 2009/0134638 | A1 | 5/2009 | Kutschat | |
| 2009/0235767 | A1 | 9/2009 | Garneau et al. | |
| 2010/0045052 | A1 * | 2/2010 | Kutschat | E05B 79/20 292/196 |
| 2012/0292922 | A1 * | 11/2012 | Andiano | E05B 85/247 292/56 |
| 2013/0049378 | A1 | 2/2013 | Kutschat | |
| 2018/0044945 | A1 * | 2/2018 | Geringer | E05B 47/0603 |

FOREIGN PATENT DOCUMENTS

| | | |
|---|---|---|
| CN | 106801548 | 6/2017 |
| CN | 207212007 | 4/2018 |
| CN | 108005494 | 5/2018 |
| CN | 108412329 | 8/2018 |
| CN | 208102172 | 11/2018 |
| DE | 19857947 | 6/2000 |
| DE | 102006012956 | 3/2007 |
| DE | 102013012117 | 1/2015 |
| EP | 2863070 | 4/2015 |
| GB | 2401145 | 3/2004 |
| GB | 2455046 | 6/2009 |
| RO | 133187 | 3/2019 |

OTHER PUBLICATIONS

Intellectual Property Office, Search Report for Great Britain Patent Application No. 1910909.9 dated Jan. 8, 2020, 2 pages.

China National Intellectual Property Administration, Office Action for Chinese Patent Application No. 202080061374.8 dated Sep. 13, 2022, 8 pages.

* cited by examiner

LATCHING ASSEMBLY

CONTINUING DATA

The present application is a continuation-in-part from pending International Application No. PCT/GB2020/051160 filed May 13, 2020, which designates the United States and claims priority to United Kingdom Application No. 1910909.9 filed Jul. 31, 2019.

BACKGROUND OF THE INVENTION

1. Field of the Invention

The invention concerns a latching assembly and methods of using the same. In particular, the latching device contains at least two jaws which can be locked in a closed position to provide a secure mechanism to fix two items together.

2. Description of the Related Art

The following descriptions and examples are not admitted to be prior art by virtue of their inclusion within this section.

There are numerous examples of latches designed to secure sheet metal enclosures or panels. A typical latch is shown in US20090235767A1. In this example, there is a latching device that has a single jaw arranged in a housing. The jaw is profiled with two arms to accept a locking bar when in the open position, and pivots around a point when the locking bar is pushed towards the housing until reaching a stop. At that point the arms of the jaw act to retain the locking bar within the housing. However, the arrangement of existing mechanisms is prone to weakness and thus does not generally provide a level of security that is desirable. Furthermore, the internal arrangement of components in existing devices are often complex, thus increasing production costs and also providing more opportunity for the device to fail if one or more components of the internal mechanism become compromised.

SUMMARY OF THE INVENTION

The latching device described herein utilises a novel internal mechanism which reduces the complexity of the internal parts and increases the quantity and surface area of the critical locking elements, overall increasing the durability whilst reducing the overall cost of manufacturing. The following description of an embodiment of the latching assembly is not to be construed in any way as limiting the subject matter of the appended claims.

An embodiment of a latching assembly includes a housing and at least two jaws arranged symmetrically and pivotally mounted to the housing, wherein the jaws able to rotate and latch independently of one another, the jaws are pivotable between an open position and a closed position, and the jaws are biased towards the open position. The latching assembly further includes a locking member, wherein the jaws each include a slot to receive the locking member when in the closed position. The locking member is moveable between a locked position, where the locking member enters a void created by the slot to prevent further rotation of the jaws to lock the jaws in the closed position, and an unlocked position to allow the jaws to revert to the open position.

BRIEF DESCRIPTION OF THE DRAWINGS

Other objects and advantages of the invention will become apparent upon reading the following detailed description and upon reference to the accompanying drawings in which.

Figure 1:
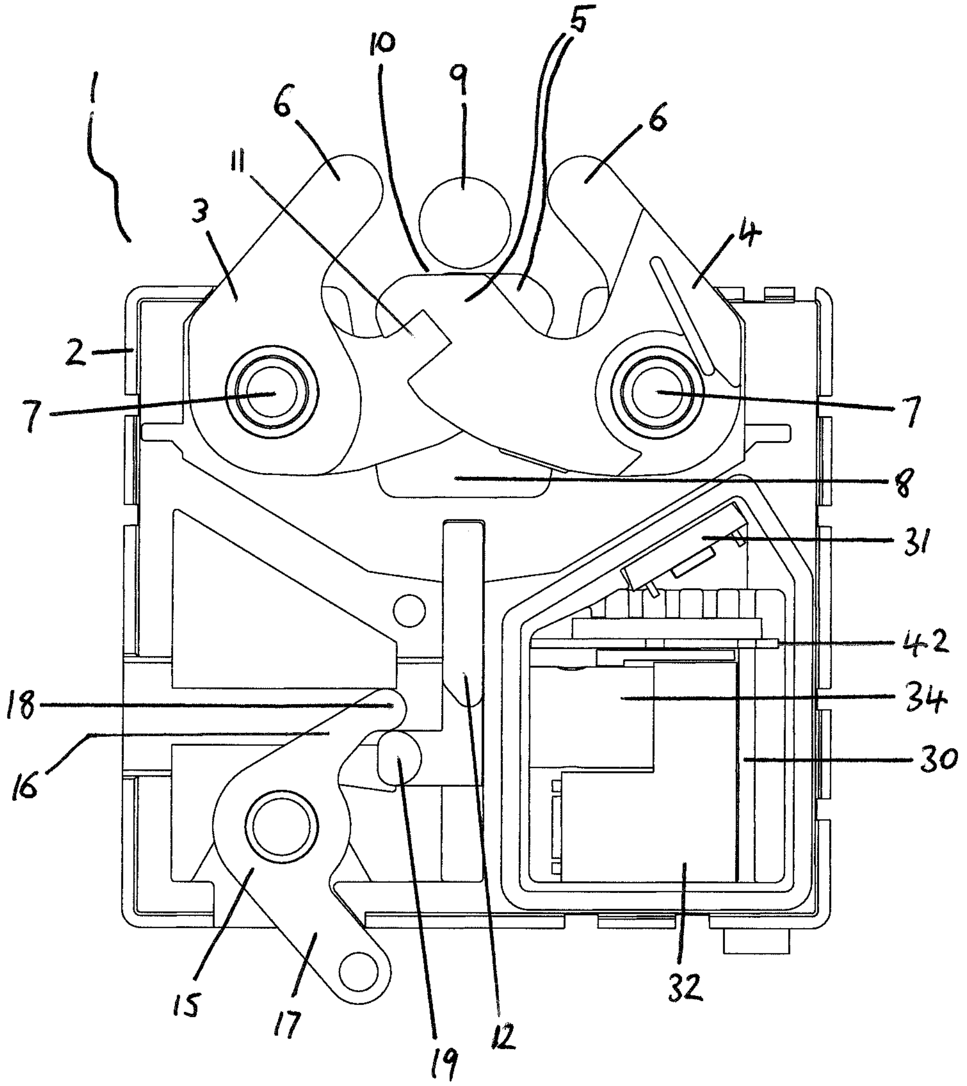
FIG. 1 is an internal view of a latching assembly with the top casing removed, showing the jaws in the open/unlocked position.
Figure 2:
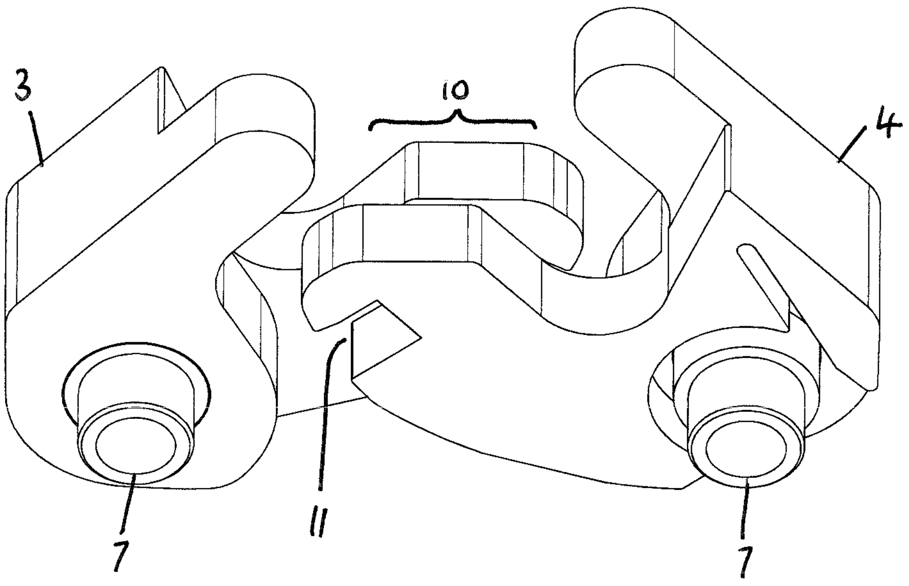
FIG. 2 is a view of the jaws of FIG. 1 in the open/unlocked position.
Figure 3:
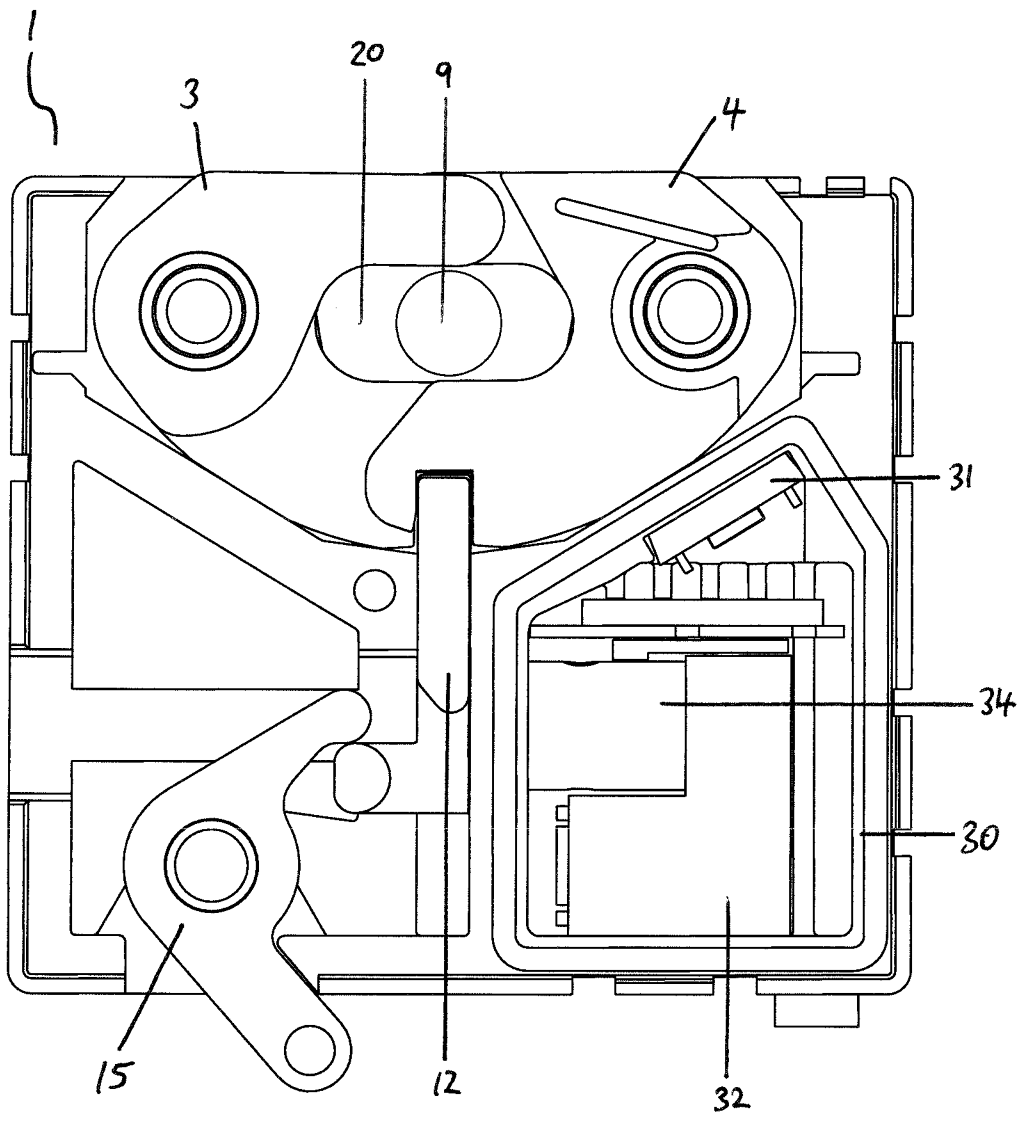
FIG. 3 is an internal view of the latching assembly with the top casing removed, showing the jaws in the closed/locked position.
Figure 4:
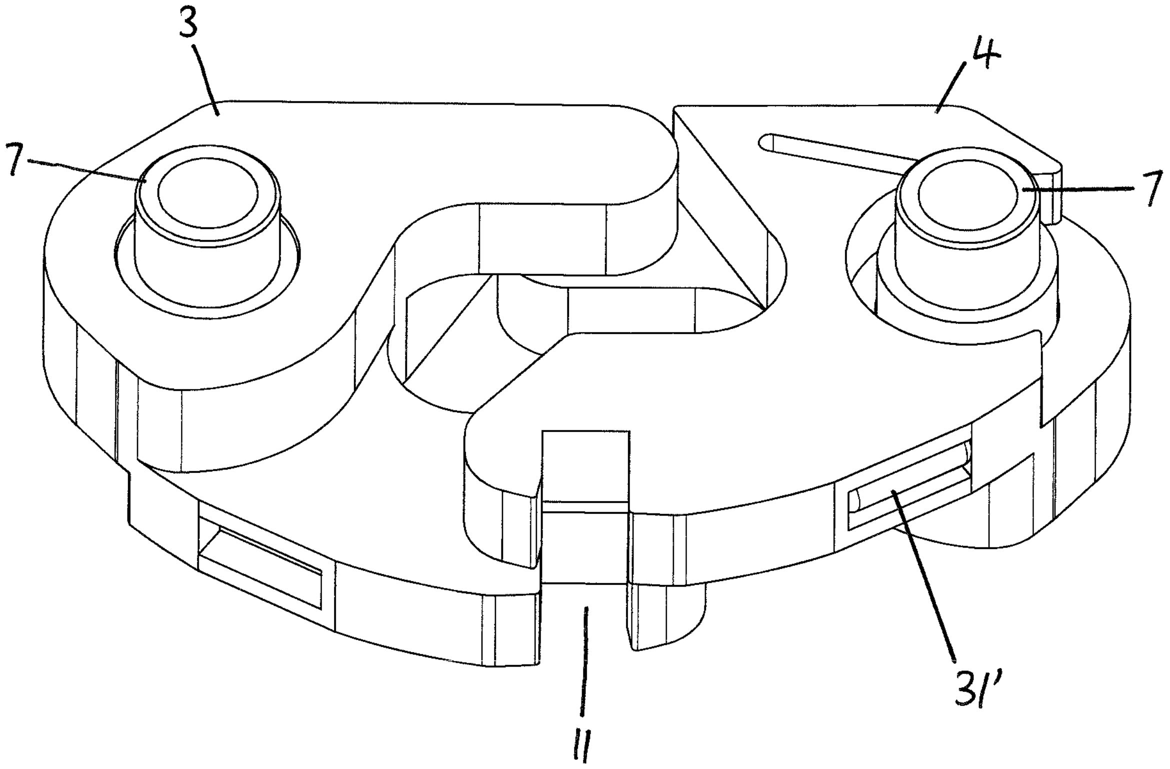
FIG. 4 is a view of the jaws of FIG. 3 in the closed/locked position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

One arrangement of the latching assembly disclosed herein is show in FIGS. 1 to 6. In this arrangement it is shown that the latching assembly (1) comprises a housing (2) in which at least two jaws (3, 4) are pivotally mounted. In the arrangement shown the number of jaws is two. However, alternative arrangements of the jaws are possible. For example, multiple sets of jaws may be used, for example with two or more jaws layered on top of one another on one or both sides.

One or more, and in some cases both or all, of the jaws are profiled in a manner whereby two arms (5, 6) project from the part of the jaw where the pivot (7) is positioned. This is clearly shown in FIGS. 1 and 2, for example. For ease of reference, we denote those arms as the "proximal" (5) and "distal" (6) arms when considered in relation to the rear of the housing (i.e. the side of the housing opposite the jaws). In some cases, the jaws are symmetrical, although this does not necessarily have to be the case. Symmetry is in relation to a point centrally positioned between the jaws, rather than in relation to the housing assembly. For example, the jaws can be offset in relation to a mid-point of the housing such that the latching assembly as a whole is not symmetrical. As also is clearly highlighted in the figures, the jaws may be oppositely arranged in their symmetrical configuration. The jaws can be made from any suitable material depending on the desired final use of the latching assembly. For example, stainless steel which provides a good amount of cutting protection for anti-vandal purposes.

The housing (2) comprises a recess (8) through which at least one of the arms (5) of the jaws extends. The recess is generally profiled to create a guide path for a locking bar (9) or similar locking element. This locking bar/element (9) is typically attached to or associated with a second member (not shown) to which it is desired to secure to a first member, said first member being attached to the latching assembly (1) disclosed herein. The recess (8) can aid with alignment of the locking bar/element (9). Typically, a latching assembly such as disclosed herein can be used on items comprising a door or the like (e.g., drawer, etc.) which is desired to be closed and secured to prevent unauthorised access. In such arrangements, the latching assembly will be situated on the inside of the enclosure in a position whereby it can accept a locking bar/element which is attached to the door of the item. On closure of the door, the locking bar/element is therefore pushed into the recess (8) in order to activate the jaws to close around the locking bar/element.

The jaws (3, 4) are arranged such that when in an open position (see e.g., FIGS. 1 and 2) they present a region (10) to accept the locking bar/element. The region (10) that accepts the locking bar/element is formed by a surface of the proximal arm (5) of the jaw. In some cases, the proximal arm of both or all of the jaws will be profiled in a manner to be able to be contacted by the locking element/bar. In this arrangement, the region (10) of the jaws presents a suitable surface against which the locking bar/element can push so as to pivot the jaws towards the rear of the housing. In the figures the profile of the proximal arms (5) of the jaws is shown to be flat or substantially flat in the region where the locking bar/element would push against them. However, it is possible to have alternative profiles. For example, the region of the proximal arm of one or more of the jaws may incorporate a concave profile in order to present a surface that is complementary to a cylindrical locking element/bar. The profiles of the arms of the jaws will typically be such that a smooth closing and opening action can be achieved, for example to reduce the chances of the locking bar/element snagging during opening and/or closing which might prevent optimal performance of the latching assembly. For example, the profile of the proximal arm can contain a reflex angle in order to aid the locking member locate in the slot.

An advantage of the latching assembly disclosed herein is that the jaws can rotate and latch independently of one another (i.e., the jaws need not be linked to each other in a manner whereby they are dependent on one another in their movement, and the locking member can interact with the slot on each jaw either together or individually/sequentially to prevent further rotation of each jaw independently of one another). Thus, if one jaw is depressed it will still latch shut. Such a situation could occur if, for example, the door on which the locking bar/element was misaligned. However, in the arrangement of the latching assembly (1), when inserting the locking bar/element (9) into the recess (8) it interacts with the proximal arms (5) of both the jaws simultaneously. On further insertion the locking bar/element rotates the jaws around their pivots (7) until the distal arms (6) of the jaws close over the locking bar/element (9) and overlap with each other, thus trapping the locking bar/element (9) within the recess (8) of the housing. This is the closed position of the jaws, as shown in e.g., FIGS. 3 to 6. In arrangements where the jaws are symmetrical, the symmetry will cause the jaws to rotate equally and overlap into the closed position. It will be appreciated that the arrangement of the locking jaws when in a closed position provides a void (20) created between the arms of the jaws in which the locking bar/element resides. Since the locking bar/element will typically be smaller than the volume of the void, the void generally provides for a larger degree of lateral movement of the locking bar/element within the void towards either, or sometimes both, of the pivots as compared to existing single jaw devices, where lateral movement is typically restricted and minimal. This additional allowed movement allows some movement between components of the item to which the latching assembly and locking bar/element are attached without compromising the locking capacity of the assembly.

In some arrangements of the latching assembly (1), the jaws are biased towards the open position. This can be achieved in many alternative ways known to the skilled person. In some arrangements, the jaws will be biased using a spring (e.g., a rotational spring), which keeps the jaws in an open position when at rest (i.e., when no forces are present to overcome the bias and rotate the jaws towards the closed position). Typically, the spring will be arranged around the pivot point (7), and the jaw will have a groove to accommodate the, or a portion of the spring.

However, other arrangements can be employed to achieve the same effect and are within the capability of the skilled person to understand working alternatives. The jaws can be biased towards the open position with varying degrees of strength to suit different operational requirements (e.g., to secure larger doors).

In order to secure the jaws once in the closed position (which typically is when, or near when, the rotation limit of the jaws in reached), in some arrangements the latching assembly (1) further comprises locking means to lock the jaws in position. A number of mechanisms can be employed to achieve such an effect. In some arrangements, one or both/all of the jaws comprises a slot (11) in the proximal arm (5). In some of such cases, the slot (11) is positioned in the proximal face of the proximal arm. Where a slot is present in both/all of the jaws then when the jaws are in the closed position the slots in each arm align with each other to create a void. When the jaws are in the closed position, the void created by the slot (11) in the proximal arm(s) (5) aligns with a locking member (12) which can then move into the slot to prevent further rotation of the jaws. The locking member can be made from any suitable material depending on the desired final use of the latching assembly. For example, stainless steel.

In some arrangements of the latching assembly (1) this locking member (12) is biased towards said jaws such that its natural tendency is to engage the jaws and enter the slot. Such a bias can be achieved by a spring (e.g., pushing or pulling the locking member towards the slot, depending on how the spring and locking member are configured), although alternative elements will be known to the skilled person. In such an arrangement during the rotation of the jaws the proximal face of the proximal arms (5) will drive the locking member (12) towards the rear of the housing and when the slots (11) in the jaws align the locking member can move into the engaged position. The skilled person will appreciate that the proximal faces of the jaw can be profiled in such a way as to create a sloped face that gradually depresses the locking member as the jaws are rotated until the locking void is created and the locking member can move into the engaged position. An advantage of this arrangement is that active measures are only required to perform an unlocking cycle. For example, in arrangements where a motor assembly is present (discussed in more detail below), power is only required to the motor when unlocking is desired.

In alternative arrangements the locking member (12) does not need to be biased towards the jaws. In such arrangements the locking member can be moved actively into the slot (11). This can be done automatically, for example through the use of an electronic motor residing with the housing which interacts with the locking member, or by manual means where the locking member is physically pushed into the slot.

This can be achieved for example by a lever that interacts with the locking member in order to push it towards the jaws.

In order to disengage the locking member (12) from the slot (11), and thereby allow the jaws to rotate to the open position, the locking member must be retracted from the slot. This can be achieved in a number of ways. One arrangement is through the use of a lever (15) which interacts with the locking member (12).

In certain arrangements the lever (15) is pivotally mounted in the housing and comprises a first arm (16) that interacts with the locking member. A second arm (17) is also present on the lever such that when the second arm is manipulated the lever pivots and moves the first arm. The first arm may comprise a lobe section (18). The locking member may comprise a projection (19). In some arrangements, when the lever is manipulated the first arm (e.g., the lobe section on the first arm) will interact with the projection on the locking member such that when the lever is manipulated the locking member is retracted from the slot. In alternative arrangements, the lever might be permanently fixed to the locking member through other mechanical fixings. Moreover, the lever may not be pivotally mounted to the housing, but instead can be arranged to interact directly with the locking mechanism such that pulling on the lever will disengage the locking mechanism. An alternative arrangement is that the locking member itself can be manipulated directly without the need for an intermediate lever.

The lever can be manipulated manually or itself can be connected to a motorised system which can be activated to move the lever.

Figure 7:
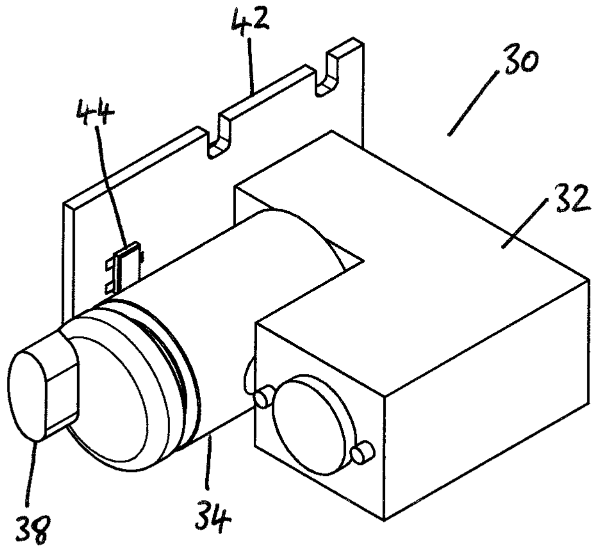
FIGS. 7-9 are views of the motor and driving rod assembly.
Figure 8:
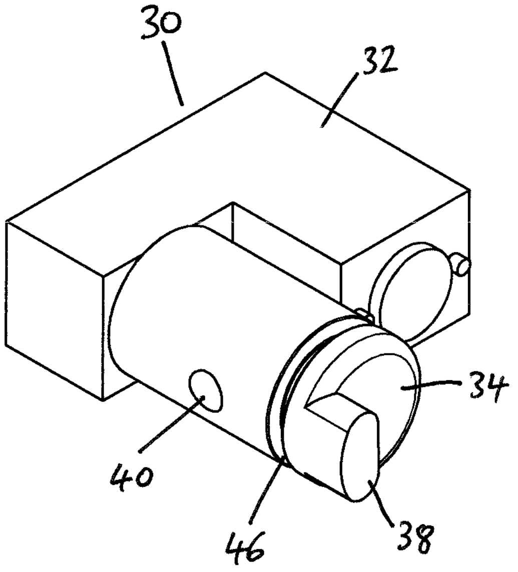
Figure 9:
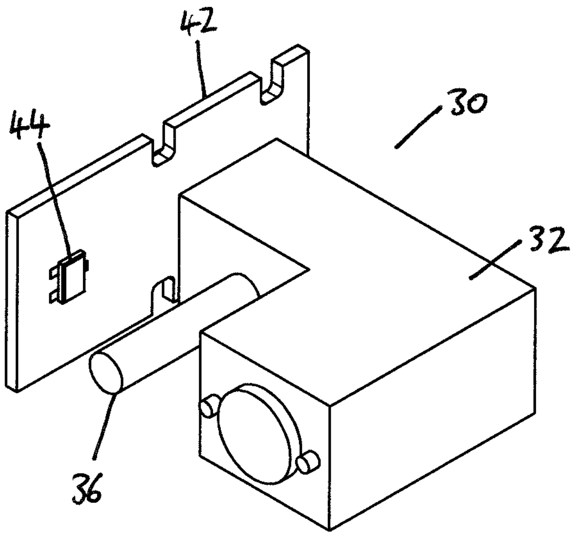

In addition to, or as an alternative to, any arrangements of the latching assembly containing a release lever, some arrangements of the latching assembly comprise an electronic motor assembly (30). An example of such an assembly is shown in more detail in FIGS. 7 to 9. It is to be noted that such an assembly can function as an independent system and is not limited to use in the latching assemblies described in detail herein. For example, the electronic motor assembly can be used in other systems and devices where the movement of a member (such as the present locking member (12)) by interaction with the driving rod is desired. The electronic motor assembly is typically connected, either via wires or wirelessly, to a controller whereby the controller is used to activate the motor and unlock the latching assembly. In some arrangements, the controller is a keypad. However, the controller can be arranged in a virtual manner e.g., through a computer system or app. In arrangements where the motor assembly is controlled wirelessly, the motor assembly will comprise suitable circuity and/or CPU programmed to activate the motor in response to commands received from the controller. Power to the motor assembly can be provided either via a mains supply directly or indirectly (e.g., through a transformer to convert mains voltage to a lesser voltage as required by the motor), or also can be provided through a battery connected to the motor assembly. Typically, the power required by the motor is 12V, although other suitable voltages will be known to the skilled person. The use of a battery may be advantageous in situations where mains supply could be compromised.

In some cases, the motor assembly (30) comprises a motor (32) and a driving rod (34) that is moveable by the motor. In some arrangements, the driving rod can be a separate component that is fixable to a shaft (36), which shaft is directly driven by the motor. However, in other arrangements the driving rod can be the same component as the shaft (36). The driving rod in turn is arranged to interact with the locking member (12) such that when the motor moves the driving rod the movement is also transferred to the locking member. The skilled person will be aware of many ways that the driving rod can interact with the locking member. In one arrangement, the driving rod comprises a projection or peg (38) which for example rides inside a groove on, or is otherwise attached to, the locking member. In some arrangements, the locking member may therefore be profiled such that a section of the locking member receives the projection from the driving rod. The projection of the driving rod may be profiled to assist in smooth operation of the mechanism on interaction with the locking member and to reduce the chances of snagging. Thus, when the driving rod moves, the interaction of the projection with the locking member also forces the locking member to move. In some cases, the motor is configured to move the driving rod back and forth as required in a reciprocating motion. In such a manner, the motor only needs to rotate in a single direction and speed to perform the lock and unlock of the jaws. Furthermore, the motor need only draw power until it has reached its desired positon so as not to use excess power.

In some arrangements, the driving rod also contains one or more magnets (40) that are used to monitor the rotational positon of the driving rod by suitable electronic circuitry (42) associated with the motor assembly. In some arrangements the driving rod contains two magnets, optionally positioned opposite one another on the driving rod. The electronic circuitry (42) will typically contain a sensor (44) which is activated by a magnet (40). In some arrangements the sensor can be a reed switch or the like. The electronic circuitry can be used to read and control the rotation of the driving rod (via the motor) based on feedback from said magnets and translate this rotational position into a linear position of the locking member (12). The locking member can therefore be selectively held in the engaged forward position or retracted positon without supplying power to the motor.

In some arrangements the driving rod contains a groove for a seal such as an o-ring (46) (and after final assembly an o-ring residing in that groove (not shown)) for improved water resistance between the compartment of the latching assembly containing the locking member and the compartment housing the motor assembly. In this way, any electronics contained within the motor assembly compartment are protected.

In some arrangements, the control circuit of the motor assembly can perform calibration tasks to ensure that the driving rod is in the correct position. This can be done on an "as required" basis, or each time the unit is activated.

In arrangements additional or alternative to those described herein, the latching assembly can comprise a switch (31) that is triggered by magnetic fields produced by the locking jaws (3, 4). Such a magnetic field can be produced by the jaw, or a portion of the jaw residing adjacent to the motor assembly, being made of a suitable magnetic material. Alternatively, a magnet can be incorporated on or into the jaw adjacent to the motor assembly such that when the jaw is rotated into or out of the closed positon the magnetic field triggers the switch mechanism and can provide feedback revealing if the jaws are in the closed or open position. See e.g., FIG. 4, item (31'). The switch (31) is typically connected to an auxiliary system (not shown) such as an alarm system or the like. In response to a change in the switch status (e.g., if the magnet in the jaw is moved away from the switch, thus indicating that the jaw has moved from a closed/locked to an open/unlocked position), the auxiliary system can activate a further protocol (e.g., sounding an alarm, notifying a controller of the unlocked status, etc.). The output can also be used by a variety of alternative systems according to the desired use of the latching assembly. For example, the switch can be monitored by a safety system. For example, the data can be used as both feedback to report the locking element is fully encompassed and the jaws are closed, and also to intelligently drive the locking member into position only when required.

Turning now to the housing (2), it can be seen that in certain arrangements such as shown in the figures each jaw is pivotally mounted to the housing. These pivot mountings (7) (made from any suitable material, e.g., brass) provide at least two important functions. One is to provide a point at which the locking jaws (3, 4) can pivot. Secondly the fasteners (which optionally can be threaded) that pass though these mounts (7) act to reinforce the entire mechanism. In some arrangements the latching assembly is attached to the first member through these mounts (7). In the closed position with the locking member (12) extended into the slot (11) of the locking jaws and mounted to the first member, if the jaws of the latching assembly are attempted to be forced open then the latching assembly would be under two major loads. One would be a compressive force on the locking member (12) where the slots (11) of the jaws would be compressing the locking member in their attempt to revert to the open position. In this regard, if the locking member is made from a suitable material (e.g., metal such as stainless steel) then this section is unlikely to deform. Secondly the locking jaws (3, 4) would be under force to separate and be pulled from the housing. However, the pivot mounts (7) provide a robust stop towards each end of the jaw which act to prevent any such movement of the jaws. Thus, the chances of the jaws being able to be separated is greatly diminished.

Figure 10:
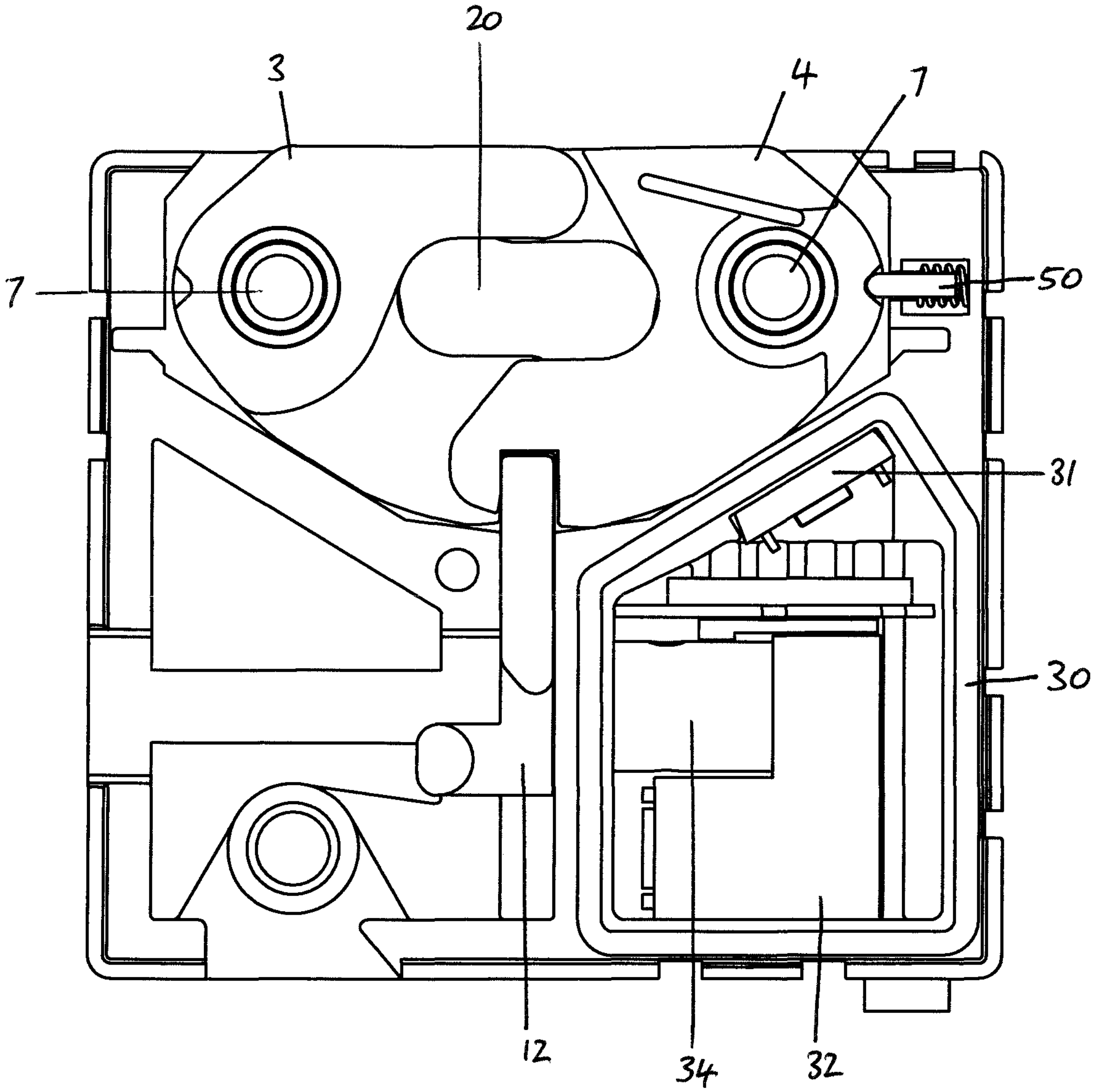
FIG. 10 is an alternative internal view of the latching assembly with the top casing removed (not all elements shown), showing a domed plunger to prevent the jaws from springing open.

As discussed above, in order to secure the jaws once in the closed position, in some arrangements the latching assembly (1) further comprises locking means to lock the jaws in position. In some arrangements in addition or alternative to those described herein, as shown in FIG. 10 there is provided a frictional dampening device. For example, this can be in the form of a plunger (50) situated in the latch housing. In some cases, this plunger is biased towards the jaw sited adjacent to it, for example using a spring. The plunger rides along the diameter of one or both of the locking jaws, which are profiled such that when the jaws are rotated to the closed position the plunger enters a groove in said jaws. In order to aid a smooth transition into and out of the groove, in some arrangements the face of the plunger can be domed. On entering the groove in the jaw, there is provided a frictional force which overcomes the spring opening force of the rotating jaws. In such a situation, the jaws will not spring open when the locking member only is retracted. To unlock and open the latch an external force is needed to be supplied in addition to the retraction of the locking member. This external force would typically be provided by a user pulling on a door handle linked to the locking bar/element.

As discussed above, there are a number of benefits of the latching assemblies described herein. In typical existing single-jawed latching devices, the internal arrangement of the locking jaw and locking member typically only provides a very small area of abutment between the two components in order to lock the device, and only in one direction. However, with the locking member described herein being arranged to enter the void created by the slot (11) in the proximal arms (5) when they are positioned in the closed position there is provided a much greater area of abutment between the locking member and each jaw, and in two directions. This results in a much more secure engagement.

Figure 5:
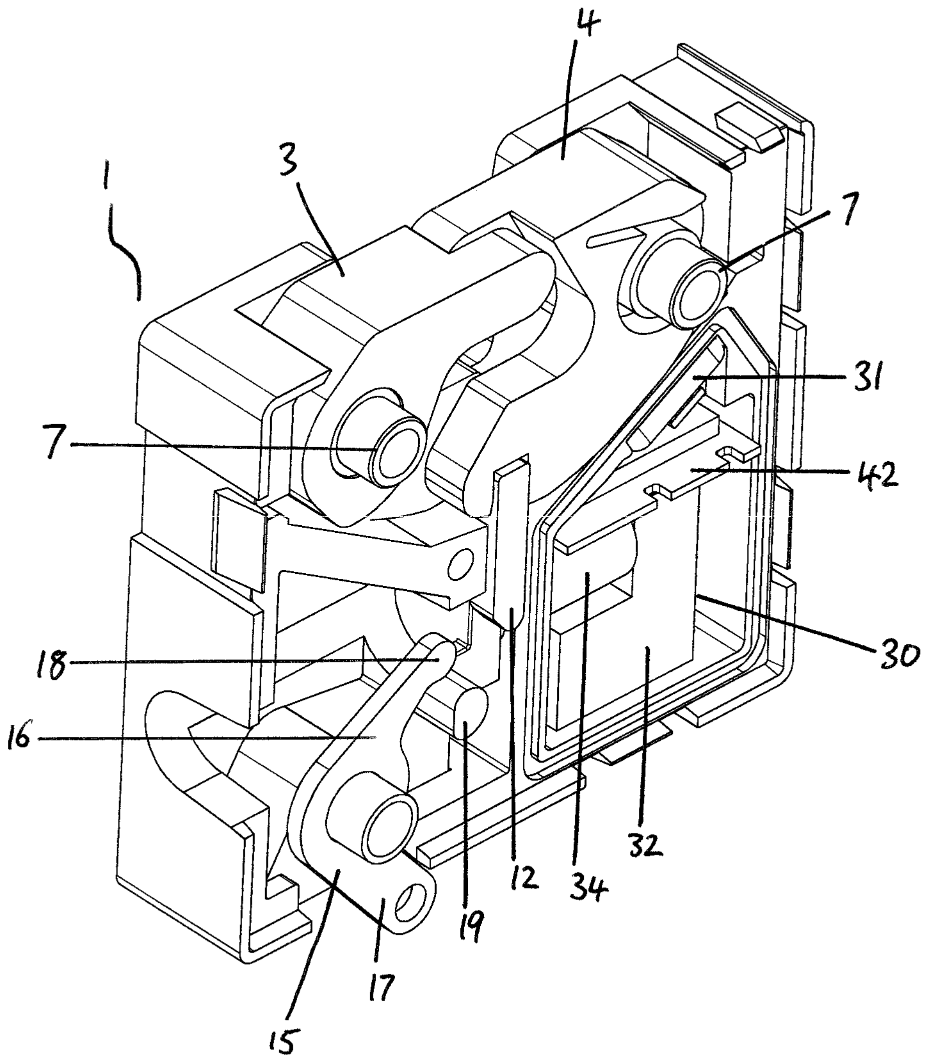
FIG. 5 is another internal view of the latching assembly with the top casing removed, showing the jaws in the closed/locked position.
Figure 6:
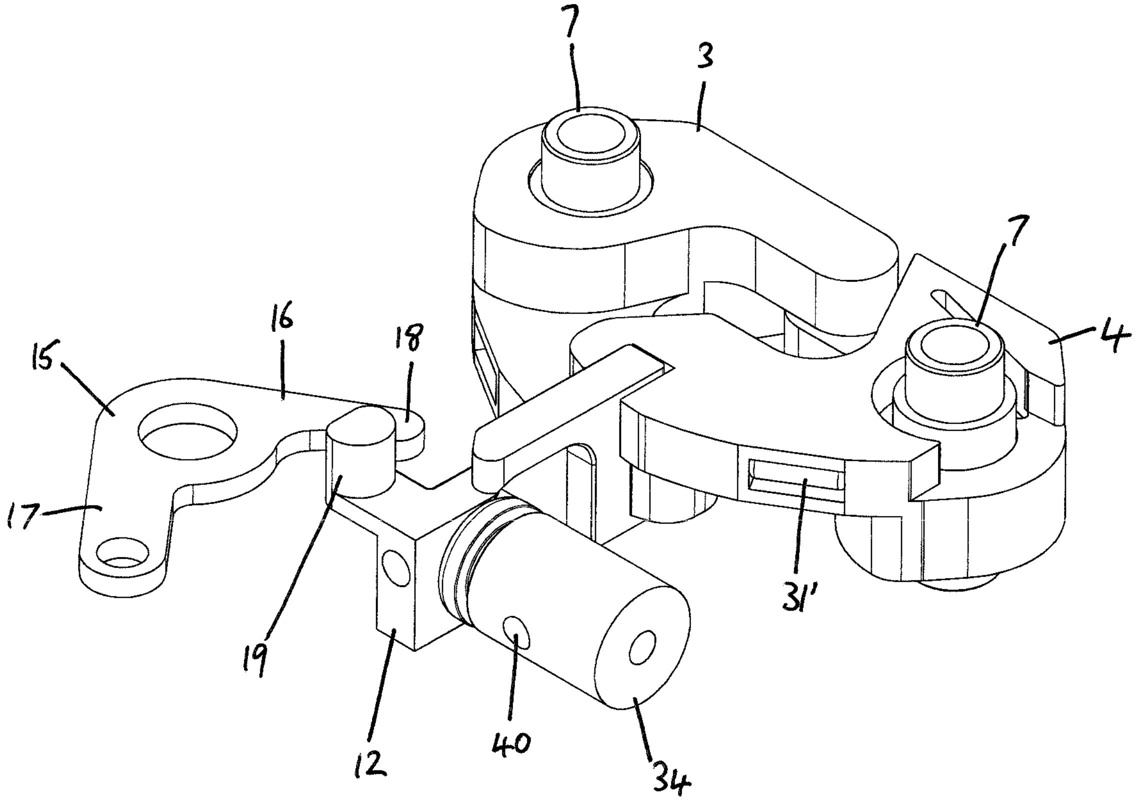
FIG. 6 is a component view of the interaction between the jaws, locking member, driving rod and release lever.

An additional benefit of utilising two jaws is that the surface area protecting the locking bar/element is effectively double that of a single jaw device. See e.g., FIG. 5, showing the double depth of the locking jaws when in the closed position. This provides additional strength to the assembly, as well as improved anti-vandal capacity.

In general, a latching assembly for releasably securing a first member to a second member is provided herein. The latching assembly includes a housing, at least two jaws pivotally mounted to the housing, wherein the jaws are pivotable between an open position and a closed position, and a locking member moveable between a locked position to lock the jaws in the closed position and an unlocked position to allow the jaws to revert to the open position. In some cases, the latching assembly comprises no more than two jaws. In some embodiments, the jaws are arranged symmetrically. In some cases, the jaws may be biased towards the open position and in specific embodiments, the bias is provided by a spring. In some cases, the jaws may comprise a slot to receive the locking member when in the closed position. In such cases, the slot may be on a proximal surface of a proximal arm of each jaw. In any case, the latch assembly may comprise a release mechanism to move the locking member to an unlocked position. In some embodiments, the release mechanism includes a lever having an arm that engages the locking member and, in some cases, the lever is pivotally attached to the housing.

In some cases, the latch assembly may include a motor assembly comprising a motor and a driving rod arranged to be in engagement with the locking member to move the locking member into a locked position, into an unlocked position, or reversibly between a locked and unlocked position. In some arrangements, the motor assembly includes a sensing means to determine the rotational position of the driving rod and/or to determine when one or more of the at least two jaws is in a closed or open position. In some cases, the sensing means may include at least one magnet and the motor assembly may include an electronic system which is activated by a change in a magnetic field to determine the rotational position of the driving rod and/or to determine when one or more of the at least two jaws is in a closed or open position. In some embodiments, the locking member may be biased towards the locked position, and in specific cases, the bias is provided by a spring. In some cases, the jaws may pivot around mounting holes and such holes may be used to mount the latching assembly onto the first member. In any case, the latching assembly may include a frictional dampening device associated with at least one of the locking jaws.

It will be appreciated to those skilled in the art having the benefit of this disclosure that this invention is believed to provide a latching assembly and methods of their use. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A latch receiving assembly comprising:
   a housing;
   at least two jaws arranged symmetrically and at least partially inside the housing, wherein the at least two jaws are pivotally mounted to the housing and are able to pivot independently of one another, wherein each of the least two jaws are pivotable between a respective open position and a respective closed position, wherein the at least two jaws each comprise a slot, and wherein the at least two jaws are arranged such that in their respective closed positions their slots align with each other forming a common void;
   a first spring configured to bias one of the at least two jaws towards its respective open position;
   a second spring configured to bias a different jaw of the at least two jaws towards its respective open position; and
   a locking member at least partially arranged in the housing, said locking member moveable between a locked position, where the locking member enters the common void created by the slots to prevent further rotation of the at least two jaws to lock the at least two jaws in their respective closed positions, and an unlocked position to allow the at least two jaws to revert to their respective open positions.

2. The latch receiving assembly according to claim 1, wherein the assembly comprises no more than two jaws.

3. The latch receiving assembly according to claim 1, wherein the assembly comprises a release mechanism to move the locking member to the unlocked position.

4. The latch receiving assembly according to claim 3, wherein the release mechanism comprises a lever having an arm that engages the locking member.

5. The latch receiving assembly according to claim 4, wherein the lever is pivotally attached to the housing.

6. The latch receiving assembly according to claim 1, wherein the assembly comprises a motor assembly comprising a motor and a driving rod arranged to be in engagement with the locking member to move the locking member into the locked position, into the unlocked position, or reversibly between the locked and the unlocked position.

7. The latch receiving assembly according to claim 6, wherein the motor assembly comprises a sensor to determine a rotational position of the driving rod and/or to determine when one or more of the at least two jaws is in their respective closed positions or their respective open positions.

8. The latch receiving assembly according to claim 7, wherein the motor assembly comprises a magnet and an electronic system which is activated by a change in a magnetic field to determine the rotational position of the driving rod and/or to determine when one or more of the at least two jaws is in their respective closed positions or their respective open positions.

9. The latch receiving assembly according to claim 1, further comprising a spring to bias the locking member towards the locked position.

10. The latch receiving assembly according to claim 1, wherein the jaws pivot around mounting holes in the housing.

11. The latch receiving assembly according to claim 10, wherein said latch receiving assembly is mountable to a first member via the mounting holes.

12. The latch receiving assembly according to claim 1, further comprising at least one frictional dampening device arranged in the housing and configured to slide along an outer periphery of at least one of the jaws while the at least one jaw is moving.

13. The latch receiving assembly, wherein the at least two jaws and the locking member are configured such that when one jaw of the at least two jaws is in its closed position and another jaw of the at least two jaws is not in its closed position, the locked member in its locked position occupies the slot of the one jaw without occupying the slot of the other jaw.

14. A latch receiving assembly comprising:
   a housing;
   at least two jaws arranged symmetrically and at least partially inside the housing, wherein the at least two jaws are pivotally mounted to the housing and are able to pivot independently of one another, wherein each of the least two jaws are pivotable between a respective open position and a respective closed position, wherein at least one of the at least two jaws comprise a slot;
   a first spring configured to bias a first jaw of the at least two jaws towards its respective open position;
   a second spring configured to bias a second jaw of the at least two jaws different from the first jaw towards its respective open position, wherein the housing has a recess through which an arm of the second jaw extends when the second jaw is in its respective open position, wherein the arm of the second jaw presents a region to accept a latch when the arm extends through the recess, and wherein the second jaw is configured to pivot around a received latch upon force of the latch against the received region of the arm; and
   a locking member at least partially arranged in the housing, said locking member moveable between a locked position, where the locking member enters the slot to prevent further rotation of at least one of the two jaws to lock the at least one jaw in its respective closed position, and an unlocked position to allow the at least one jaw to revert to its respective open position.

15. The latch receiving assembly according to claim 14, wherein the first jaw comprises an arm which extends through the recess when the first jaw is in its respective open position, wherein the arm of the first jaw and the arm of the second jaw together present the region to accept a latch when the arms extend through the recess, and wherein the first jaw is configured to pivot around a received latch upon force of the latch against the received region of the arms.

16. The latch receiving assembly according to claim 14, wherein the at least two jaws each comprise a slot, wherein the at least two jaws are arranged such that in their respective closed positions their slots align with each other forming a common void, and wherein the at least two jaws and the locking member are configured such that the locking member in its locked position can occupy the common void or the slots individually depending on which of the at least two jaws are in their respective closed positions.

* * * * *